April 27, 1965 P. A. MULLER 3,180,911
METHOD OF MAKING CIGARETTE FILTER PLUGS OF FIBROUS
MATERIAL CONTAINING THERMOPLASTIC FIBERS
Filed Jan. 11, 1960 2 Sheets-Sheet 1
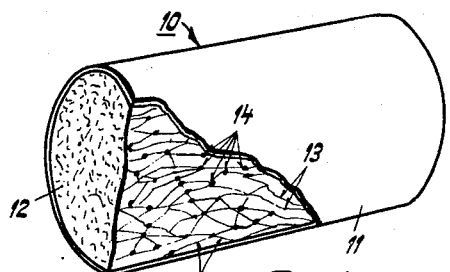
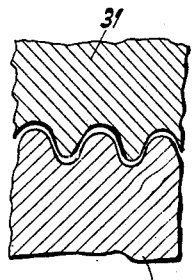
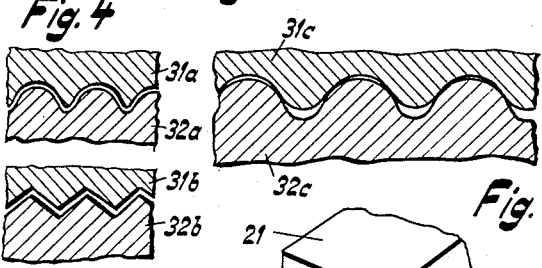
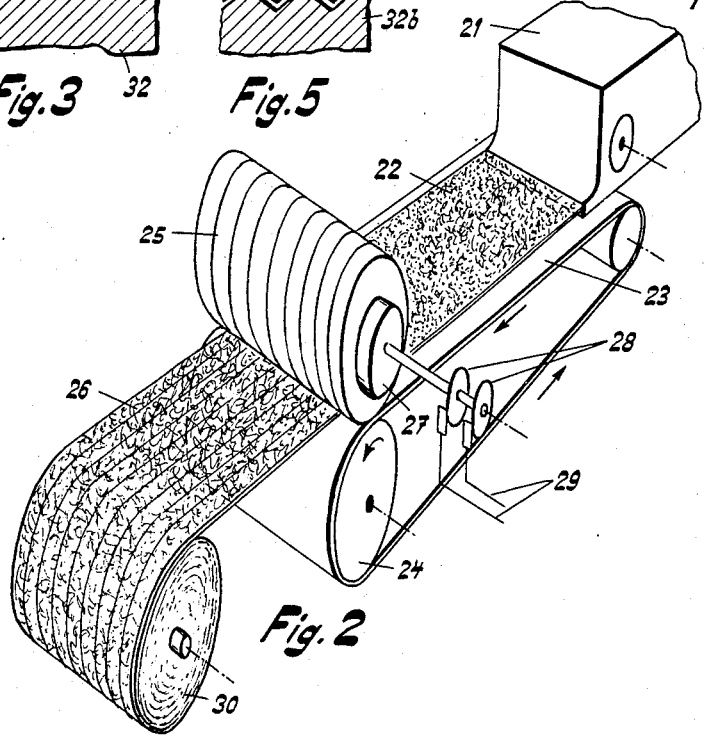

April 27, 1965     P. A. MULLER     3,180,911
METHOD OF MAKING CIGARETTE FILTER PLUGS OF FIBROUS
MATERIAL CONTAINING THERMOPLASTIC FIBERS
Filed Jan. 11, 1960     2 Sheets-Sheet 2
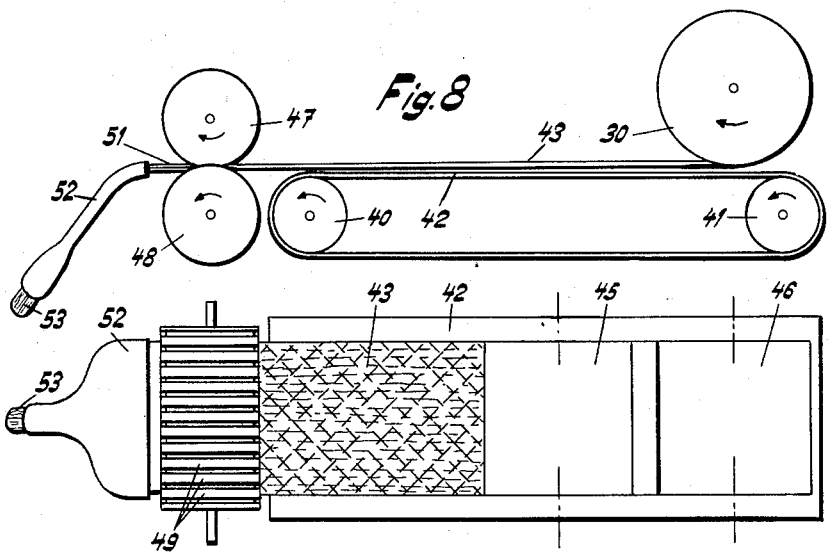
Fig. 8
Fig. 9
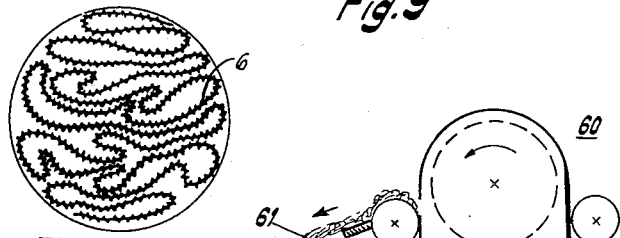
Fig. 10
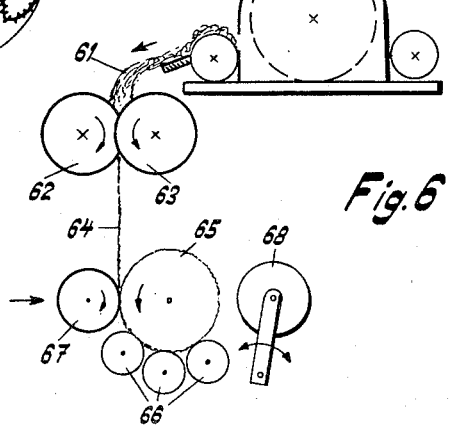
Fig. 6

United States Patent Office 3,180,911
Patented Apr. 27, 1965

3,180,911
METHOD OF MAKING CIGARETTE FILTER PLUGS OF FIBROUS MATERIAL CONTAINING THERMOPLASTIC FIBERS
Paul Adolf Muller, Triesenberg, Liechtenstein
Filed Jan. 11, 1960, Ser. No. 1,465
Claims priority, application Switzerland Sept. 22, 1959
3 Claims. (Cl. 264—119)

My invention relates to filter plugs for cigarettes and to a method of their manufacture, and is preferably applicable for the manufacture of filter strands from viscose fibers mixed with cotton or cellulose fibers, if desired with a further admixture of other hydrophile and organophile fibers of natural and/or synthetic origin.

In general, there are two fundamentally different ways of producing a filter strand to be cut into filter plugs for cigarettes, depending upon respectively different filter materials.

If a paper-like fibrous material is used as starting material, the fabrication into filters generally does not offer appreciable difficulties. However, the filter action of such materials is relatively slight unless they are subjected to special pre-treatment. Such pre-treatment of paper-like materials known, for example, from Swiss Patents Nos. 316,721 and 331,545 preferably comprises loosening of the fiber structure and hence involves disintegration. As a result excellent filter action can be attained, so that such methods have found extensive commercial use.

However, if the starting material consists of fibers and fiber strands which virtually all extend parallel to the filter axis, it is a difficult problem to properly secure the individual parallel fibers relative to each other within the bunch. In most cases a suitable binding agent must be used for solidifying the fibers and fixing them against sliding. In practice, this has heretofore required using binding agents affected by considerable deficiencies, such as evolving traces of injurious solvents during smoking or impairing the taste of the cigarettes.

If such binding agents are to be avoided, the fiber material must not only consist of parallel fibers but must inherently have a sufficiently strong texture in the bunch. Even in form of a wad or other conglobation in which the fibers are not all oriented in substantially parallel directions, such filter plugs can be given the desired mechanical strength only at the expense of an undesirably high draw resistance.

It has already been proposed to produce filter plugs from parallel fibers and fiber strands by providing within the fiber bunch a supporting skeleton of adhesion points between mutually contacting fibers, the adhesion points being free of binding agents and solvents. As a result, the mechanical strength of the particular fibers at the adhesion points is increased at the expense of a reduced absorption and swelling ability.

It is an object of my present invention to devise an improved filter plug of the last-mentioned type which eliminates the just-mentioned deficiencies.

According to my invention, at most a portion of the fibers in the filter body are oriented approximately parallel to the axis of the filter plug, whereas the remainder or bulk of the fibers extend promiscuously in irregular direction. By providing the fiber material prior to bunching with adhesion points, as mentioned above, the sections of individual fibers adjacent to such points are fixed relative to each other within the bunch, and these sections are under tension or stress relative to each other due to the bunching of the material, thus giving the bunch the characteristics of a radially elastic wad of interiorly irregular shape with a multitude of internal hollow spaces.

According to a further feature of my invention, such a filter plug is produced by the following method. At first the fibers are spread planar in form of a thin fibrous veil, with the fibers, or at least a portion thereof, extending in promiscuously irregular directions. Then a multiplicity of adhesion points between the fibers is produced in the veil whereby fiber sections are fixed relative to each other and a network of adhesion points is obtained which is dense in comparison with the dimensions of the filter plug. Thereafter the fibrous veil is folded together into the shape of a filter strand of approximately round cross section, whereby a multiplicity of fiber sections are tensioned relative to each other.

The term "organophile" denotes "friendly to organisms," and as used herein designates a material which the living organism does not sense as a foreign body and which does not cause a hostile but rather a friendly reaction.

The invention will be described below with reference to embodiments illustrated by way of example on the accompanying drawings in which:

FIG. 1 is a perspective, schematic illustration of a filter plug according to the invention.

FIG. 2 illustrates schematically an example of apparatus for preparing a flat tissue web of material for the purposes of the invention.

FIGS. 3 to 5 and 7 are partial views of embossing rollers in longitudinal section, such rollers being applicable in apparatus according to FIG. 2.

FIG. 6 is a lateral view of another fabricating apparatus generally comparable to that of FIG. 2.

FIG. 8 is a lateral view, and

FIG. 9 is a schematic top view of an apparatus for producing a filter strand from a prepared tissue web of fiber material; and FIG. 10 shows schematically an example of web folds typical for a filter produced on the apparatus according to FIGS. 8, 9.

The filter plug 10 shown in FIG. 1 comprises the usual envelope 11, for example of thin paper, which encloses a fiber bunch 12 of oval or circular cross section. As apparent, some of the fibers 13 may extend predominantly parallel to the axis of the filter plug. The entire fiber bunch 12 is permeated by a multitude of adhesion points, only schematically represented in FIG. 1, which interconnect mutually intersecting or laterally contacting fibers. Such adhesion points 14 are clearly visible when taking such a filter plug apart either before or after using the filter. In principle, it is irrelevant by which particular means the adhesion of the fibers at the points of contact is produced. These adhesion points, for example, may be brought about by gluing the mutually adhering fibers together with the aid of an organophile binding agent or solvent such as those applicable with hydrophile fibers. Suitable binders are various adhesives of natural origin, namely starches, albumin, waterglass or mucilage. However, the network of adhesion points is preferably made by joining together of the fibers together with mechanical deformation of the fibers at the joined intersections.

The fiber bunch 12, thus strengthened by a multitude of promiscuously distributed adhesion points 14, forms a wad of interfolded fibrous tissue with a multitude of internal hollow spaces, which exhibits noticeable elasticity. Due to the fact that the constituent tissue material is gathered and folded together transversely of the axial direction of the filter plug, as schematically shown in FIG. 10, the wad is under elastic tension radially of the filter axis, so that an unused plug will swell radially when the envelope 11 is cut open lengthwise of the filter. The fiber sections 6 between respective adhesion points are tensioned relative to each other but can strongly swell and soften when being used without fully losing their elasticity or excessively impairing the stability of the fiber bunch held together by the spatial skeleton network of adhesion points. Consequently the strength of the filter plug, contrary to those heretofore known, is independent to a great extent of the changes in fiber strength occurring during use of the filter. For that reason the invention also affords the possibility of using fiber material of strong absorptivity and attaining high filter action in spite of the slight draw resistance. By virtue of the radial pressure to which the filter is subjected by the envelope, no shrinking of the filter plug occurs during its use, so that it is not necessary to glue or otherwise attach the filter plug to the envelope 11 as heretofore usual. A dropping-out of the filter plug due to shrinking does not take place even when during smoking the filter plug is turned and kneaded between one's fingers.

The spatial network of adhesion points within the conglobation of fibers has the further advantageous effect of constrainedly guiding the smoke through a multiplicity of irregularly arranged hollow spaces and in intimate contact with the absorbing and/or absorbing fiber material. This very desirable effect can be controlled, namely augmented or reduced, by varying or selecting the spatial distribution and arrangement of the adhesion points, by giving the fiber different densities, and by suitable choice of the type and thickness of the fibers being used. This can be done by producing the filter plugs in accordance with the method more fully described herein below.

For producing the filter plugs according to the invention a synthetic fiber or filament may be used that consists, for example, of viscose produced from a solution of cellulose xanthogenate in diluted caustic soda and which is pressed as a tenaciously liquid filament through nozzles into a warm spinning bath of strongly salt-containing, diluted sulphuric acid. The bath causes the spinning solution to precipitate in the form of viscose filaments which, after washing and drying, can be subdivided into the desired length of fibrous stock. Preferably used for filter plugs according to the invention are viscose fibers, thus made, of 3.5 to 14 denier. Such viscose fibers may have a specific weight, for example, of 1.5 g./cm.$^3$ and a strength of 22 to 41 kg./mm.$^2$. However with cellulose acetate synthetic fibers, a specific weight of about 1.3 g./cm.$^3$ and a strength of 13 to 21 kg./mm.$^2$ is customary. For varying the separating action of filter plugs according to the invention, a mixture of fibers of respectively different denier degrees may also be used.

The humidity absorption of such viscose fibers or filaments is approximately 13.5% at 65% relative atmospheric humidity, and about 44 to 48% at 100% relative air humidity, in comparison with the corresponding absorptivity values of about 6.0% and 15%, respectively, of cellulose acetate filaments. Thus, the synthetic viscose fibers or filaments possess a considerably better absorptivity for humidity than cellulose acetate fibers, nylon or the like. The reason for this can be seen in the fact that with the last-named fibers the humidity can essentially precipitate only at the surface, whereas with the hydrophile viscose fibers the liquid precipitating on the surface is sucked into the interior of the fiber. This induction of liquid is clearly manifested by swelling and considerable increase in cross section of the viscose fibers. Tests made with filter plugs of such hydrophile and swellable synthetic fibers and filaments, including bunches or strands composed of different viscose fibers, have shown that the fibers should exhibit at least 100% increase in cross section for satisfactory separation and retainment of the liquid tar and nicotine constituents of the smoke.

Aside from the greatly improved filtering action of plugs according to the invention made of the above-mentioned preferred hydrophile and swellable fiber material, such plugs have the further advantage that their fibrous substance is conspicuously organophile, in contrast to the injurious behavior of other synthetic fibers. Consequently, any fiber particles, such as the inevitable and not completely removable dust resulting from cutting the fibers, as may reach respiratory organs, particularly the lungs, during smoking, immediately start swelling when in contact with the humid mucous membranes and thus lose their injurious splinter shape. Such particles become rapidly rounded at all corners and points and turn flaccid, thus being rendered just as free of danger as natural fiber dust originating from seeds, blossoms and fruits that ordinarily pass with the atmosphere into the respiratory tract. Furthermore, the hydrophile synthetic fibers, when in swollen condition, possess only slight floating ability which facilitates their natural elimination from the respiratory tract.

According to the presently available knowledge, only hydrophile synthetic fibers of great swelling ability are harmless in all respects to the breathing organs. However it has heretofore been infeasible or excessively difficult to use the described and similarly behaving hydrophile and swellable synthetic fiber materials for filter plugs. The high degree of swelling, indispensable for increasing the filtering action as well as for hygenic reasons, has the consequence that, when such filter plugs are being used, the individual fibers become soft, tacky and flaccid so that the filter plug loses its shape and solidity to such an extent that the resistance to drawing smoke through the filter is excessively increased and the mechanical strength excessively reduced. This behavior of hydrophile synthetic fibers has made the use of these materials for smoke filters heretofore appear unsuitable, and was the reason for the failure encountered with experiments and attempts that have been made for years in industry.

These shortcomings however are virtually completely eliminated if the fibers, gathered and folded together to the shape of the filter plug, form a conglobation with a multitude of pretensioned fiber sections due to a dense network of adhesion points between individual fibers as described above.

A filter plug of the type described and composed of hydrophile, non-curled viscose fibers made as described above has a spatial filling factor between 3.5 and 4.5%. Such a degree of filling is also obtainable with filter plugs composed of non-hydrophile acetate synthetic fibers, but only if curled acetate fibers are used. Filter plugs made of straight or smooth acetate synthetic fibers are unsuitable because of the high draw resistance but would, of course, result in a much higher filling factor. The fact that the filter plug according to the invention, made of non-curled fibers, possesses a filling factor that corresponds to the filter plugs of the conventional type made of curled fibers, also constitutes an improvement with respect to the manufacture of the plugs because all operating steps heretofore necessary for curling the fibers can be dispensed with.

A filter plug according to the invention, if desired, may also be produced from fibers curled in any manner and in that case affords obtaining still lower filling degrees together with good filtering action. It should be noted however that, according to the present knowledge, the curled hydrophile fibers lose their curled shape when swelling, but this behavior can be modified to the extent necessary to make such fibers also suitable for the purposes of the invention.

A method previously known as such for producing the above-mentioned adhesion points is based upon the observation that crossed-over synthetic fibers will adhere to each other when the intersection is heated and subjected to sufficient pressure. When synthetic fibers or filaments are deposited on a support in order to form a thin tissue or veil in which all fibers are promiscuously oriented within the plane of the veil, then a large number of individual fibers will form a correspondingly large number of intersection points. If such a fibrous veil of viscose fibers were to be compressed, for example between smooth and planar platens, in a direction normal to the fiber web, then the veil previously transportable only by means of a supporting surface or conveyor belt, would be converted into a noticeably stiffened, self-supporting sheet which would also have relatively great mechanical strength in the transverse direction. A web of viscose fibers thus treated would, of course, be too stiff for use in cigarette filters. It rather suffices and is preferable for the purposes of my invention to subject the fibrous veil only to partial strengthening by pressing the veil together not over its entire area but only along a suitable planar embossing pattern. The embossed pattern can be produced, for example, by flat platens having a ribbed platen surface, or also by rotating rollers on which a corresponding embossing pattern is formed by protruding ribs or bosses on the peripheral roller surfaces. An embodiment of the latter type is illustrated by way of example in FIG. 2.

The veil or fleece of synthetic fibers is prepared in a fiber depositing and spreading apparatus 21 in known manner. The apparatus 21 may comprise a carding machine, a converter of conventional design, or any other mat producer, it being in some cases of advantage to use relatively short-fibered stock. The apparatus 21 places a loose and thin fleece or veil 22 of fibers upon the endless conveyor belt 23 rotating in the direction of the arrows shown in FIG. 2. The belt 23 passes over a roller 24 which serves as a counter roller for a rotating embossing roller 25. The surface of the embossing roller 25 possesses a pattern of protruding irregularities, for example parallel ring-shaped ribs or ridges as indicated in FIG. 4. The roller 25, subjected to adjustable pressure, presses the veil 22 against the belt 23 and the roller 24 so that the ribs or bosses on the periphery of roller 25 leave a visible embossed pattern of embossment points and parallel longitudinal grooves on the now strengthened fleece or veil 26 as it emerges from between the two rollers.

If desired, the embossing roller 25 may be heated additionally, for example by means of an electric heater 27 which is supplied with electric current through slip rings 28 and leads 29. Such heating is particularly important when using thermoplastic synthetic fibers. The embossed fibrous veil 26, now self-supporting to some extent, passes from embossing roller 25 to a take-up roll 30 which is wound up by means of known winding devices.

FIG. 3 shows another, preferred embodiment of a roller pair for embossing the fibrous veil 22 (FIG. 2) with a pattern of parallel longitudinal grooves. The embossing roller 31 consists of steel and the counter roller 32 of hard and dense paper. The counter roller 32 has an originally cylindrical and smooth peripheral surface into which peripheral grooves are pressed by means of the embossing roller 31 so that the surface irregularities on both rollers accurately match each other. Both rollers may have a diameter of about 300 mm. and a peripheral surface speed of 15 to 25 cm./second, for example. The embossing pressure may be 8,000 kg. at a roller length of 100 cm., for example. When fabricating a fibrous veil of viscose fibers of 5.5 denier, the embossing roller 31 is preferably heated to a temperature of about 110° C. A weight of the fibrous veil, provided with longitudinal grooves, within the limits of 15 to 50 grams per m.² has been found preferable for the manufacture of cigarette filter plugs.

There is also the possibility of admixing to the fiber web 22, made of the described hydrophile and swellable synthetic fibers, a quantity of other fibers of natural or synthetic origin. For example, when natural fibers such as cellulose fibers, cotton fibers and the like are admixed, the described solidification by production of an adhesion-point network with the aid of an impressed embossing pattern, can likewise be obtained because experience has shown that an intersection of a natural fiber and a synthetic fiber will cause adhesion when subjected to pressure or to conjoint pressure and heat. In lieu of natural fibers, the fiber web of hydrophile and swellable synthetic fibers may be given an admixture of synthetic fibers having smaller swellability. This is of advantage in some cases where the absorption effect of the hydrophile synthetic fibers is to high. In the latter case, too, the solidification can be effected by an impressed embossing pattern. A veil of fibers composed of hydrophile and less hydrophile synthetic fibers is also of advantage in some cases inasmuch as the less swellable synthetic fibers retain their stiffness during use of the filter and thus act like a supporting skeleton for the softening more-hydrophile synthetic fibers.

As mentioned, it is not necessary that all fibers in the veil of fibers on the conveyor belt be promiscuously oriented. Some of the fiber stock may also be oriented in the travelling direction of the belt. This can be done as the fibers pass out of the dispensing and spreading apparatus 21, by subjecting the loose veil to the action of tines or rake-type rollers. As a result, a minor quantity of the fiber material extends approximately in the longitudinal direction of the veil. Of course, there must always be a sufficient quantity, preferably a predominant quantity, of promiscuously oriented fibers in order to secure a sufficient number of adhesion points and a sufficient number of mutually fixed fiber sections, so that after transverse gathering and folding of the embossed veil to the shape of the filter plug, a sufficient radial pressure or tension is reliably obtained. The parallel directed fibers may be those of 5 to 8 denier for example, and the promiscuously oriented fibers may be of 3.5 to 5.5 denier.

In the fabricating machinery according to FIG. 6, the planar veil 61 issuing from the fleece-forming device 60 is converted by embossing rollers 62 and 63 to a solidified web 64 and then rolled up into a roll 65 which rests upon supporting roller 66 and is kept under radial pressure by means of a pressure roller 67. Rotating cutter blades 68 are forced in regular intervals of time against the roller 65 and subdivide the web into sections of the desired width.

Several fibrous veils consisting at least in part of hydrophile synthetic fibers, may be placed upon each other and may then be embossed simultaneously. Furthermore, individual fibrous veils or webs can first be provided with an adhesion point pattern as described above and can thereafter be placed upon each other. In the latter case, however, no further pressing should be imposed upon the veil layers in order to prevent tearing of the mutually fixed fiber sections. According to another method, a first fibrous web of fibers extending predominantly parallel to the travelling direction is covered by a second veil consisting predominantly of promiscuously oriented fibers, whereafter both webs are passed together through a pair of embossing rollers.

With pairs of rollers as shown in FIGS. 3 to 5 and denoted by 31 and 32, 31a and 32a, 31b and 32b, it is preferable to make one roller adjustable relative to the other so that the interspace between the roller surfaces can be adjusted. This affords operating in such a manner that by reducing the free interspace, the fibrous veil, while being embossed with the adhesion point pattern, is being stretched in the transverse direction. As a result, thinned-out zones or areas in the veil are produced. Such transverse stretching has been found advantageous for increasing the filtering action of the plugs.

FIG. 7 shows a design of the embossing rollers 31c, 32c whose respective surface configurations do not exactly match each other but are so shaped as to produce transverse stretched zones of reduced fiber density in the veil.

An example of equipment for further fabrication of a tissue web in form of a wound-up roll made according to the method described above, is illustrated in FIGS. 8 and 9. The apparatus comprises a conveying device formed of two rollers 40, 41 and an endless conveyor belt 42. The belt is supplied from a roll of web material 30 with a fibrous web previously provided with a network of adhesion points. Due to the preceding strengthening of this loose and very thin veil in equipment corresponding, for example, to the one shown in FIG. 2 or FIG. 6, it is possible to wind such tissue webs at least one on and off. According to FIG. 9, the tissue web 43 being used is provided with an embossed pattern of mutally intersecting diagonal lines. This strengthened tissue web is supplied to another pair of embossing rollers 47 and 48. The rollers 47, 48 are provided for example, with a large number of mutually engaging peripheral ribs or ridges 49 of which only those of the upper roller 47 are visible in FIG. 9. The tissue web emerging from between the roller pair 47, 48 of wavy configuration and now provided with longitudinal grooves in the form of waves with longitudinal areas of alternately greater and smaller fiber density enters into a gathering device 52 of known type in which it is folded or gathered together in shirring fashion, transversely to its travelling direction to emerge as a filter strand 53 of circular or oval cross section, as may be desired. The strand is subsequently cut by suitable machinery to form the individual filter plugs. The device 52 is essentially a funnel which causes the web, previously preshaped to a wavy configuration by the rollers 47, 48, to become pleated and bent to the desired strand shape, thus producing a folding pattern generally typified by the one shown in FIG. 10.

It is preferable to apply only slight embossing pressure for producing the network of adhesion or embossment points in the web of supply roll 30, in order to prevent as much as possible a splintering of the fiber sections fixed by the adhesion points, when the longitudinal grooves are being produced by the rollers 47, 48.

The mutually engaging ring-shaped ribs or ridges 49 of the two rollers 47 and 48 may be given a design similar to that described above with reference to FIGS. 3, 4, 5 and 7. Depending upon the width of the interspace between the rollers, the travelling tissue web can either be subjected to no more than the deformation into wavy shape, or the rollers 47, 48 may also act to emboss the web and/or to additionally stretch the web in the transverse direction for zone-wise loosening to provide it with areas of attenuated fiber density. The conversion of tissue web into wavy shape by rollers with mutually engaging peripheral ribs, prior to gathering the web transversely, has been found particularly favorable because such a web readily lends itself to being subsequently shaped in the gathering device 52 into a round or oval filter strand 53, and such a filter strand has been found to have especially favorable properties after being fabricated into filter plugs. The strengthened longitudinal zones extending lengthwise of the filter plug, further augment the mechanical strength of the plug during its use, and in this respect coact with the strengthening due to the mutually fixed and tensioned fiber sections within the plug.

If desired, a tissue web may also be produced which does not have wavy shape but is approximately planar while likewise possessing strengthened zones extending in the longitudinal direction of the web and alternating with intermediate non-solidified and loose longitudinal zones.

I claim:
1. The method of producing a cigarette filter plug of fibrous material containing thermoplastic fibers, which comprises spreading a fibrous stock on a planar surface with the predominant amount of the fibers extending in promiscuously different directions so as to form a tissue web, heating and embossing the web with a pattern of embossment points so as to produce in the web a network of adhesion points between mutually intersecting fibers in dense distribution relative to the filter dimensions, then bending the individual sections of the fibers being fixed between the said adhesion points, and transversely gathering and folding the web together in the transverse direction of the web to the shape of a radially elastic filter body.

2. In the method according to claim 1, the steps of embossing the web with longitudinal grooves prior to said transversely gathering the web, and simultaneously stretching the web transversely so as to provide it with areas of attenuated fiber density.

3. The method of producing a cigarette filter plug of fibrous material containing thermoplastic fibers, which comprises spreading a fibrous stock on a planar surface with the predominant amount of the fibers extending in promiscuously different directions so as to form a tissue web wherein the fiber material is in ribbon-shape spread-out condition, heating and embossing the web, while said material is in said condition, with a pattern of embossing points so as to produce in the web a network of adhesion points between mutually intersecting fibers in dense distribution relative to the filter dimensions, drying said web to fix said adhesion points, and thereafter transversely stretching and folding, in the transverse direction of the web, the individual sections of the fibers so fixed at locations between said adhesion points to produce tension between the mutually fixed individual fiber sections, and forming the web so folded into the shape of a radially elastic filter body of round cross section.

References Cited by the Examiner
UNITED STATES PATENTS

| | | | |
|---|---|---|---|
| 2,164,702 | 7/39 | Davidson. | |
| 2,649,394 | 8/53 | Crewson | 156—326 XR |
| 2,707,308 | 5/55 | Taylor et al. | 154—90 |
| 2,774,680 | 12/56 | Hackney et al. | |
| 2,780,573 | 2/57 | Davidson. | |
| 2,793,572 | 5/57 | Parmele. | |
| 2,794,480 | 6/57 | Crawford et al. | |
| 2,812,767 | 11/57 | MacHenry | 131—10 |
| 2,847,086 | 8/58 | Muller. | |
| 2,849,932 | 9/58 | Marogg. | |
| 2,916,038 | 12/59 | Wade. | |
| 2,916,039 | 12/59 | Muller | 131—208 |
| 2,928,400 | 3/60 | Touey. | |
| 3,012,302 | 12/61 | Parmele et al. | |

FOREIGN PATENTS

| | | |
|---|---|---|
| 719,310 | 5/56 | Great Britain. |
| 757,283 | 3/60 | Great Britain. |

EARL M. BERGERT, *Primary Examiner.*

CARL F. KRAFFT, A. G. STONE, *Examiners.*